Figure 1:
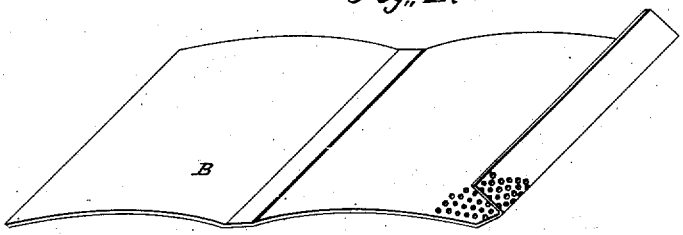

2 Sheets—Sheet 1.

C. THERYC & A. OBLASSER.

SECONDARY ELECTRIC BATTERY.

No. 11,442. Reissued Sept. 18, 1894.

Witnesses
W. R. Edelen.
Samuel K. Fisher.

Inventors
Charles Theryc & Alfred Oblasser
by Foster & Freeman
their attorneys.

C. THERYC & A. OBLASSER.

SECONDARY ELECTRIC BATTERY.

No. 11,442. Reissued Sept. 18, 1894.

Witnesses.
W. R. Edelen
Samuel H. Fisher.

Inventor:
Charles Theryc & Alfred Oblasser,
by Foster & Freeman
their attorneys.

UNITED STATES PATENT OFFICE.

CHARLES THERYC AND ALFRED OBLASSER, OF PARIS, FRANCE.

SECONDARY ELECTRIC BATTERY.

SPECIFICATION forming part of Reissued Letters Patent No. 11,442, dated September 18, 1894

Original No. 500,978, dated July 4, 1893. Application for reissue filed March 15, 1894. Serial No. 503,806. Patented in France November 14, 1892, No. 225,644; in Belgium November 14, 1892, No. 102,141; in Switzerland December 3, 1892, No. 6,240; in Austria-Hungary December 6, 1892, No. 62,939 and No. 90,635, and in Italy May 12, 1893, No. 38,088.

*To all whom it may concern:*

Be it known that we, CHARLES THERYC and ALFRED OBLASSER, both residents of Paris, France, have invented certain new and useful Improvements in Secondary Electric Batteries, whereof the following is a full, clear, and exact description.

Said invention has been patented in the following countries: France, November 14, 1892, No. 225,644; Belgium, November 14, 1892, No. 102,141; Austria-Hungary, December 6, 1892, No. 62,939 and No. 90,635; Italy, May 12, 1893, No. 38,088, and Switzerland, December 3, 1892, No. 6,240.

Our invention relates to a method of manufacturing an electric accumulator which will hereinafter be described in detail, and to the element or accumulator made by such method.

The electrodes of our improved accumulator are surrounded by a perforated envelope, sheath or wrapper of an insulating material or non-conductor of electricity, composed of flexible or preferably rigid sheets of celluloid, india-rubber, ebonite, gutta-percha, fibrolochoid, vulcanized fiber or other compound constituted by the same or other materials which are sufficiently good insulators. These envelopes have for their object to hold the active material, which enables the weight of heavy metallic supports or plates employed in Faure and other accumulators to be reduced, which supports were designed to contain the active material and had to be thick enough for receiving a sufficiently large quantity of materials. After the active materials have been introduced into the envelope, surrounding a central rod or plate serving as a collector, the element thus constituted is subjected to the action of a hydraulic press in order to form a single piece. The pressure applied to the plate should be just sufficient to spread and distribute the active material evenly over the surfaces of the plate between it and the envelope, and to compress it uniformly. We prefer using a hydraulic press because we obtain with it the uniform pressure desired for the purpose, and which varies, of course, with the size of the element, the quantity of active material, &c. It is not advisable to use any greater pressure than will accomplish the purpose above set forth, since excessive pressure which renders the active material dense and compact impairs the efficiency of the battery.

By our improved method of manufacturing accumulators we obtain very light apparatus with a much higher capacity than the accumulator heretofore employed. The figures which we give show the superiority of our accumulator, and this superiority is due to our improved method of manufacture.

Among the insulating materials above mentioned, celluloid is that which we preferably use for the manufacture of the envelopes, sheaths or wrappers. This material is in fact superior to the others both as regards the resistance it offers to the action of the acids and to electric actions, and the convenience of manipulation in the construction of the envelope. The celluloid employed is especially manufactured for this purpose; it is not mixed with white lead, metallic salts or oxides, pine-soot or like substances. The celluloid which we use is manufactured with pure cellulose, agglomerated by a suitable substance, camphor being the most advantageous up to the present time. The useful thickness of the sides of the envelopes, sheaths, or wrappers may be varied from a fraction of a millimeter to several millimeters, according to the dimensions, thickness and weight of the electrodes which they are to contain.

The element constructed according to our invention is distinguished in use by great endurance and large capacity compared with other types of accumulators. Structurally it is distinguished by the following characteristics: The envelope completely surrounds the conductor and active material, and being composed in all its parts of one substance united by a cement having a base of the same substance, expands and contracts equally throughout. The envelope so formed is not dislocated or ruptured in ordinary use. By the pressure applied to the finished element as stated above, the active material is distributed uniformly over all surfaces of the conducting plate, so that the sulphuric acid of the battery cannot attack it. We therefore avoid sulphurization of the plate, which is so serious a defect in batteries of other types.

The manner of carrying the invention into effect will be explained in detail, reference being had to the accompanying drawings.

Figure 2:
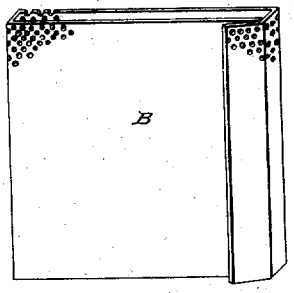
Figure 4:
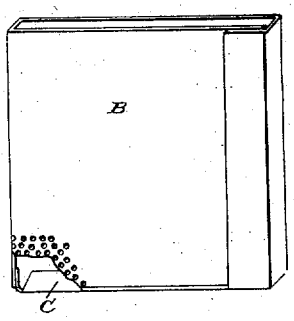
Figure 3:
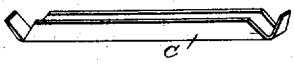
Figure 6:
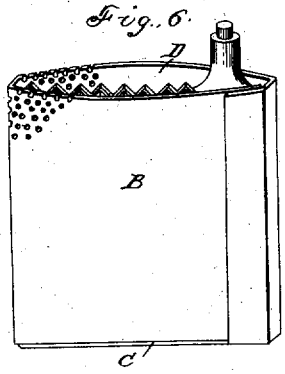
Figure 5:
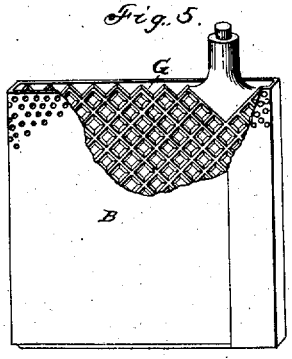
Figure 7:
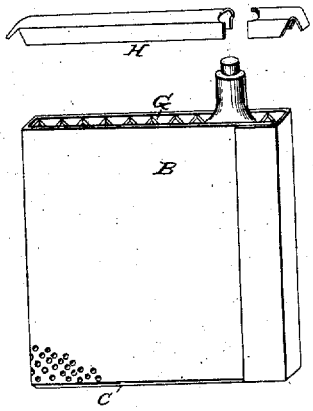
Figure 8:
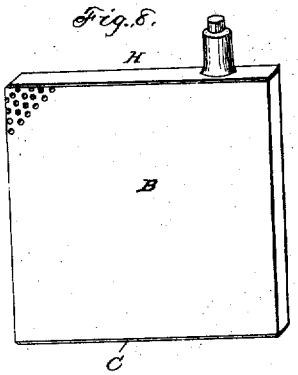
Figure 9:
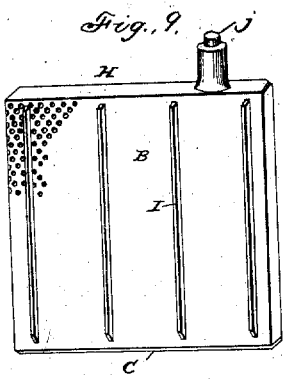
Figure 11:
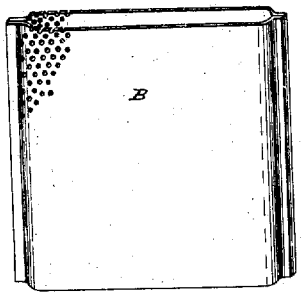
Figure 10:
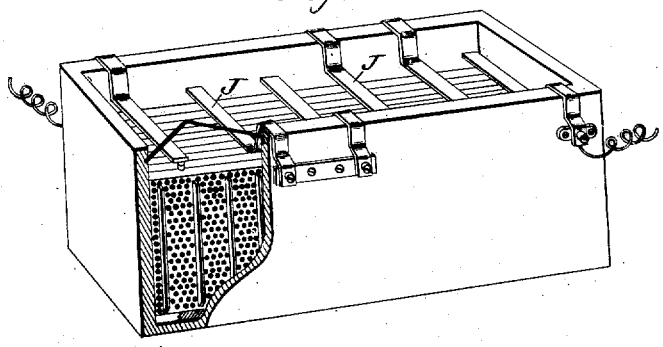

Figures 1 and 2 are perspective views of the insulating sheet at different stages of its manufacture into an envelope. Fig. 3, illustrates the strip to be applied to the bottom of the envelope. Fig. 4, is a perspective view of an envelope ready to receive the electrode. Fig. 5 is a perspective view showing the electrode in place. Fig. 6 represents in perspective the position of the envelope while being filled. Figs. 7, 8, and 9 are similar views illustrating the final steps of the process. Fig. 10 is a perspective view of a group of elements, and Fig. 11 illustrates another form of envelope.

In carrying our said invention into practice we perforate the sheets B of celluloid (Fig. 1) by means of a machine having rollers or combs provided with points which constitute punches. The holes are as small and as near together as practicable for preventing the falling through them of any considerable quantities of oxides or active material. When the sheets have been perforated they are cut to dimensions which may be varied according to the size of the electrodes for which they are designed. The sheets thus cut to size are softened by immersion in hot or boiling water or in steam, or by any other appropriate means, to render them specially malleable. On their removal from the boiling water the sheets are folded upon an iron mandrel or former of variable thickness, into the shape illustrated in Fig. 2. The edges of the folded sheet are then coated by means of a special paste or cement having a base of celluloid. When the edge of the envelope has been prepared, the lower or bottom part is first closed by a small strip C of celluloid having upturned edges, which strip is not perforated and which is fixed by means of paste or cement having a base of celluloid. The upper part is closed by means of a cover H, similarly secured after the introduction of the electrode into the envelope (Figs. 7 and 8).

The envelope may be prepared by softening a cylinder or tube of celluloid by immersion in hot water, so as to be able to give the cylinder the form of a parallelopiped, or any other appropriate form, which, after the cooling of the celluloid, will remain intact. The extremity or extremities which have remained open are finally closed as before. The envelope may also be obtained by uniting sheets of celluloid previously cut to the desired dimensions and softened by ordinary means for giving them the desired shape. The union of the sheets of celluloid constituting the sides and bottom may be effected by means of stitches with threads of celluloid, asbestos, or any other filaments which are more or less unattackable by acids and electric currents; but it is preferable to unite the sides by means of a paste or cement which has a base of celluloid.

Another mode of preparing the envelope consists in placing in a mold composed of two parts, a perforated sheet of celluloid which has previously been softened, between which the sheet is shaped by compression, so that two such sheets placed edge to edge will form a receptacle. The paste or cement having a base of celluloid may also serve for closing the openings provided for the introduction of the electrodes. For this purpose it is sufficient to simply deposit at these openings one or more sufficiently thick layers of the paste or cement which as it dries makes a hermetic joint.

The filling of the envelopes irrespective of the mode or preparation used, may take place in various manners. We will set forth in succession the several modes of filling which may be employed. One of these modes consists in introducing into the envelope a rod, grid, or plate, such as G (Fig. 5) of antimoniated lead, the form of which may be greatly varied. Through the upper opening D (Fig. 6) left free at the time of the preparation of the envelopes, which opening has also served for the introduction of the electrode, we introduce oxides either in the moist state, as a paste or in a dry state, as powder, and the envelope thus filled is passed through a gage which compels the excess of active material to leave the envelope. During the filling, the sides of the envelope are separated or caused to bulge outwardly so as to make it assume the form indicated in Fig. 6. If the oxide has been introduced in the dry state, the envelope is soaked for one or two minutes in acidulated water, which produces the pastiness.

According to another mode, the grid, rod, or plate constituting the electrode is placed in the envelope which is then completely closed. Then the envelope is put in a box filled with oxide in the form of powder, after which a shaking motion is imparted to the box to compel the oxide to pass through the holes and thus fill the envelope.

A third mode consists in introducing the envelope closed on all sides and provided with its rod, into a trough filled with acidulated water mixed with a certain quantity of oxide. By agitating the water with a stick the oxide passes into the envelope through the holes and finally fills it completely. Blocks of oxide may be made to inclose the rod and be introduced into the envelopes. In the case of envelopes presenting the form of vessels, each vessel may be filled with oxide in the form of a paste and at the moment when the sides are united the rod or plate is inserted. If spongy lead be employed as an active material we immerse an envelope which is entirely closed and provided with its rod, in an electrolytic bath. The spongy lead is deposited upon the rod, the operation being stopped when the deposit appears sufficient. The envelope is then plunged into boiling water for softening it, and next subjected to a small pressure to make it regular.

When the envelopes are filled by any of the methods above indicated they are submitted to the action of a hydraulic press so as to give them the desired regularity, thickness, and compression. Then the electrodes are allowed to dry for twenty-four hours, whereupon the upper part is closed by a cap of two parts, as already described, and (as shown in Figs. 7 and 8) the edges of which cap are fastened by means of a paste or cement having a base of celluloid. The element is then completely finished.

The envelopes, sheaths or wrappers, instead of being single like those hereinbefore described, may be multiple, that is to say several of them may be placed one upon the other, separated or not by the aid of rods of celluloid.

In addition to the advantages already stated, the envelopes, sheaths, wrappers of celluloid have the valuable qualities of adapting themselves, by their elasticity to the increasing or swelling which takes place at the time of the formation and operation of the accumulators. For maintaining between the electrodes the desired distance we fix upon the lateral faces of the envelopes, by means of a suitable cement having a base of celluloid, rods I, the thickness of which is adapted to the distance to be maintained and the expansion to be provided against.

As stated above, the envelopes, sheaths or wrappers may be made of ebonite or vulcanized and hardened india-rubber. In this case the preparation of the envelopes is effected as hereinafter set forth. We first procure sheets of soft india-rubber of a superior quality. These sheets cannot be perforated as they do not possess sufficient rigidity, and the points of the perforating tool traverse the sheets without producing the effect of the punch and the holes close up again by reason of the elasticity of the material. To obtain a favorable result we subject the sheet of india-rubber to a vulcanizing operation which is stopped when the rigidity and hardness are sufficient for enabling the piercing of the holes to be effected by means of the perforating machine, but the sheet of india-rubber must also possess flexibility enough not to break when it is bent or folded and to enable it to be fastened by means of a solution of india-rubber and benzine. When the sheets of incompletely vulcanized india-rubber have been perforated they are cut to dimensions suitable for each kind of envelope and are folded upon a former to give them the desired shape, whereupon the edges are fastened with a solution of india-rubber and benzine and the bottoms fixed in the same manner. The envelopes thus folded and cemented are then subjected to a complete vulcanization which transforms them into ebonite. The filling takes place in the same manner as in the case of envelopes of celluloid. The mounting of the electrode is effected by the aid of connecting strips J (Fig. 10) consisting of antimoniated lead and to which are attached the heads *j* (Fig. 9) of the rod or plate, the connection being made by welding, fusing, soldering or in any suitable way.

By the method of manufacturing herein specified in detail we can obtain accumulators of a much higher capacity than those heretofore known. The capacity of our accumulators is twenty-five ampère hours per kilogram of electrodes, and we realize therefore a saving varying from two hundred to four hundred per cent. in comparison with other known accumulators.

The capacities of the principal accumulators now known and used are as follows, that is to say, Faure-Sallon-Volckmar, from eight to nine ampère hours; Tudor six ampère hours; and Julien from twelve to fourteen ampère hours.

Having now fully described our invention, what we claim is—

1. In the process of making a secondary battery element, by forming an envelope with perforated sides, from sheets of celluloid or similar material in a plastic or pliable condition, filling the envelope with active material and a conductor, closing the openings through which the receptacle was filled, and subjecting the entire element to pressure sufficient to distribute the active material over the surfaces of the conductor, substantially as described.

2. A secondary battery element consisting of a conductor, active material covering all the surfaces of the conductor, and an envelope composed of perforated sheets of celluloid or similar material of the same substance throughout and tightly inclosing the conductor and active material on all sides, the active material being uniformly distributed between the conductor and envelope, substantially as described.

3. A secondary battery element consisting of a conductor, active material surrounding the same, and a perforated envelope of celluloid made from cellulose free from foreign substances as specified, and having its parts united by a cement having a celluloid as a base, the active material and conductor being inclosed on all sides by said envelope, substantially as described.

In testimony whereof we have signed this specification in the presence of two subscribing witnesses.

CHARLES THERYC.
ALFRED OBLASSER.

Witnesses:
JEAN VICTOR BARBANCEY,
JOSEPH LACOSTÉ.